(12) United States Patent
Chen et al.

(10) Patent No.: US 7,780,183 B2
(45) Date of Patent: Aug. 24, 2010

(54) SINGLE-HAND-OPERATED ACTUATING MECHANISM FOR A FOLDABLE STROLLER

(75) Inventors: Shun-Min Chen, Taipei (TW); Ru-Yi Li, Taipei (TW)

(73) Assignee: Wonderland Nurserygoods Co., Ltd., Taipei (TW)

(*) Notice: Subject to any disclaimer, the term of this patent is extended or adjusted under 35 U.S.C. 154(b) by 316 days.

(21) Appl. No.: 12/078,634

(22) Filed: Apr. 2, 2008

(65) Prior Publication Data

US 2009/0020984 A1 Jan. 22, 2009

(30) Foreign Application Priority Data

Jul. 19, 2007 (CN) .................... 2007 2 0146242 U (51) Int. Cl.
*B62B 1/00* (2006.01)

(52) U.S. Cl. ..................... 280/647; 280/650; 280/47.38

(58) Field of Classification Search ................ 280/642, 280/647, 650, 643, 47.38, 652, 658
See application file for complete search history.

(56) References Cited

U.S. PATENT DOCUMENTS

| 4,660,850 | A | * | 4/1987 | Nakao et al. ................ 280/642 |
|---|---|---|---|---|
| 5,511,441 | A | * | 4/1996 | Arai ........................... 280/642 |
| 5,524,503 | A | * | 6/1996 | Ishikura ...................... 280/642 |
| 5,535,483 | A | * | 7/1996 | Jane Cabagnero ............ 16/429 |
| 5,769,447 | A | * | 6/1998 | Huang ......................... 280/642 |
| 6,375,213 | B1 | * | 4/2002 | Suzuki ........................ 280/649 |
| 6,485,216 | B1 | * | 11/2002 | Cheng ......................... 403/102 |
| 6,550,801 | B1 | * | 4/2003 | Newhard ..................... 280/642 |
| 6,565,111 | B2 | * | 5/2003 | Ageneau ..................... 280/647 |
| 6,729,791 | B1 | * | 5/2004 | Chen .......................... 403/102 |
| 6,886,851 | B2 | * | 5/2005 | Chen .......................... 280/642 |
| 7,410,186 | B2 | * | 8/2008 | Hartenstine et al. ......... 280/643 |
| 7,686,322 | B2 | * | 3/2010 | Longenecker et al. ....... 280/642 |

* cited by examiner

*Primary Examiner*—Hau V Phan
(74) *Attorney, Agent, or Firm*—Harness, Dickey & Pierce, P.L.C.

(57) ABSTRACT

An actuating mechanism for a foldable stroller includes a mounting housing disposed on a handle tube of the foldable stroller, and a disk disposed in the mounting housing and connected rotatably to the handle tube. The disk has a notch, and a control lever extending outwardly of the mounting housing. Two cables are fastened to the disk at two diametrically opposed positions, respectively. The control lever is pushable in a lever-driving direction to rotate relative to the mounting housing to thereby move the cables. A safety latch is disposed in the mounting housing, and has an integral engagement member biased to engage the notch in the disk, and an integral pushbutton pushable in a pushbutton-driving direction opposite to the lever-driving direction so as to remove the engagement member from the notch in the disk, thereby allowing for folding of the foldable stroller.

19 Claims, 10 Drawing Sheets

SINGLE-HAND-OPERATED ACTUATING MECHANISM FOR A FOLDABLE STROLLER

CROSS-REFERENCE TO RELATED APPLICATION

This application claims priority of Chinese Application No. 200720146242.7, filed on Jul. 19, 2007.

BACKGROUND OF THE INVENTION

1. Field of the Invention

This invention relates to a foldable stroller, and more particularly to a single-hand-operated actuating mechanism for a foldable stroller.

2. Description of the Related Art

Figure 1:
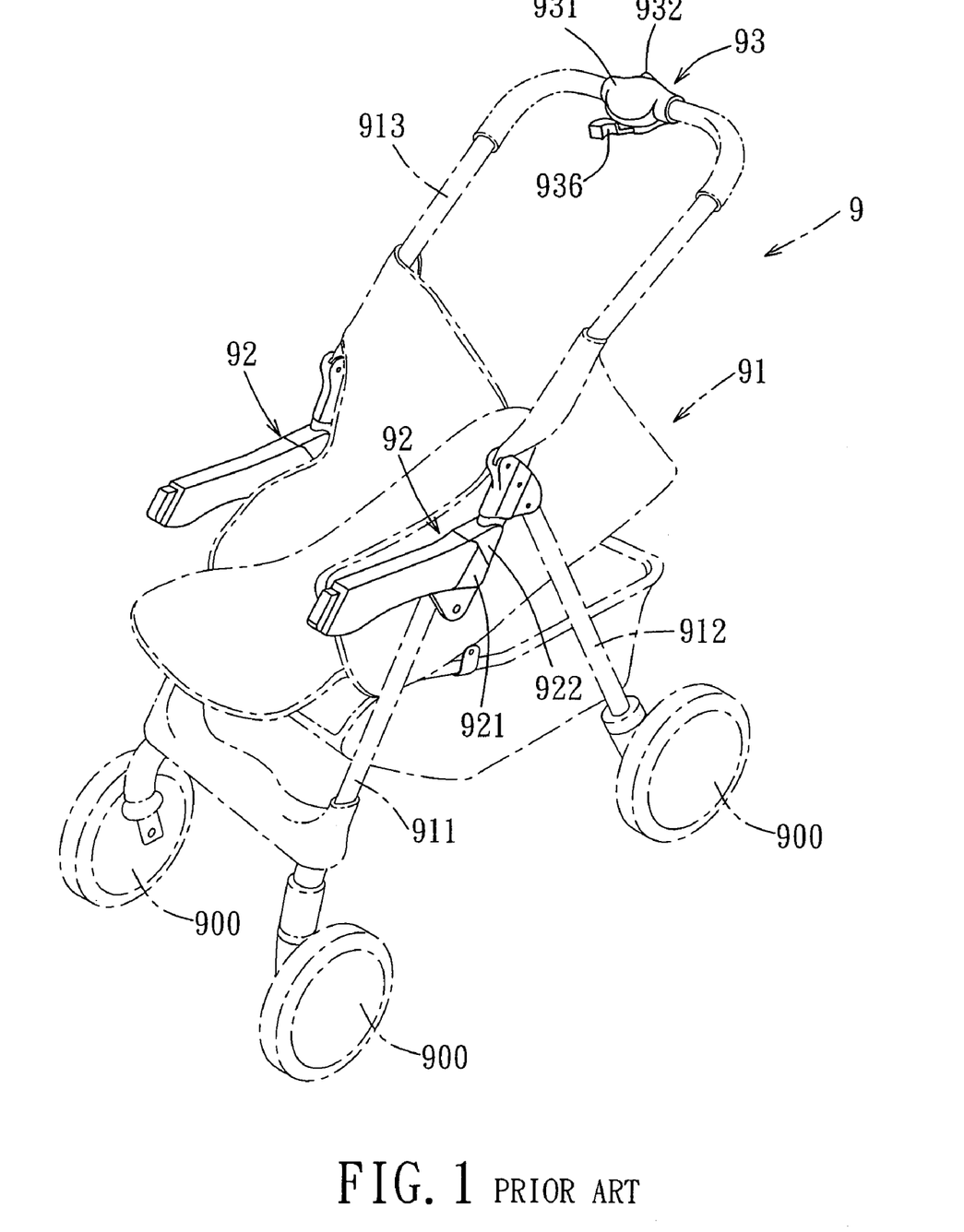
FIG. 1 is a perspective view of a conventional foldable stroller disclosed in U.S. Pat. No. 5,769,447.

Referring to FIG. 1, a conventional foldable stroller 9 disclosed in U.S. Pat. No. 5,769,447 includes a frame 91, two folding mechanisms 92, and a single-hand-operated actuating mechanism 93. The frame 91 has a pair of front legs 911, a pair of rear legs 912, and a U-shaped handle tube 913. Each of the front and rear legs 911, 912 has a bottom end mounted with a caster 900. The rear legs 912 have top ends connected respectively and pivotally to two ends of the handle tube 913. The ends of the handle tube 913 are connected respectively to top ends of the front legs 911 by the folding mechanisms 92. Each of the folding mechanisms 92 includes a first member 921 disposed on the top end of the corresponding front leg 911, a second member 921 disposed on the corresponding end of the handle tube 913 and engaging removably the first member 921, and a cable 923 (see FIG. 2) extending in the handle tube 913. Lower ends of the cables 923 are fastened respectively to the second members 922.

When the first and second members 921, 922 engage each other, the handle tube 913 and the front legs 911 are maintained in an unfolded state shown in FIG. 1, where relative rotation of the handle tube 913 and the front legs 911 is prevented.

Figure 2:
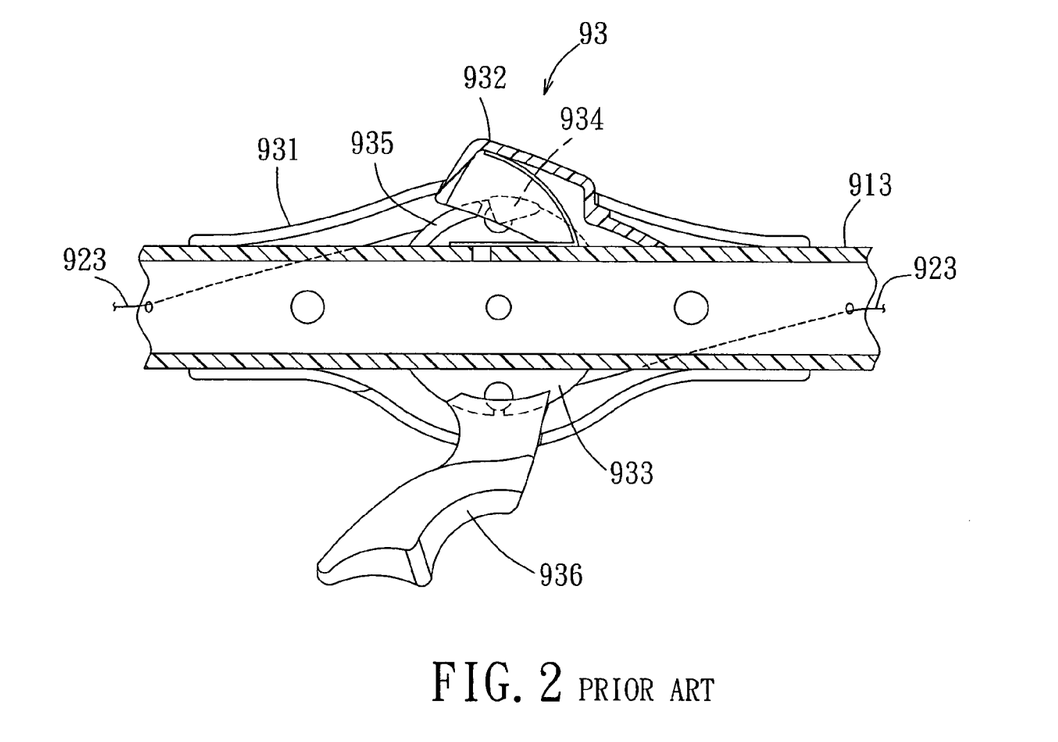
FIG. 2 is a sectional view of a single-hand-operated actuating mechanism of the conventional foldable stroller.
Figure 3:
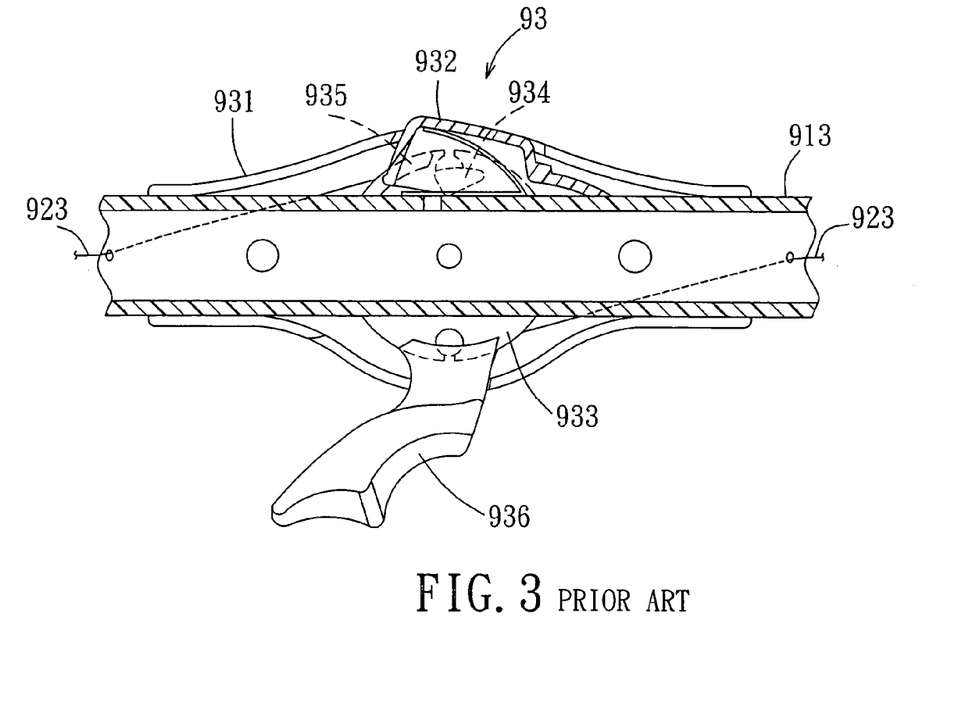
FIG. 3 is a sectional view of the single-hand-operated actuating mechanism of the conventional foldable stroller, illustrating operation of a pressing member.

With further reference to FIGS. 2 and 3, the single-hand-operated actuating mechanism 93 is disposed at a middle portion of the handle tube 913, and includes a mounting housing 931, a pressing member 932 disposed pivotally in the mounting housing 931, and a disk 933 disposed rotatably in the mounting housing 931. The disk 933 is connected rotatably to the handle tube 913. Upper ends of the cables 923 are fastened to the disk 933. The pressing member 932 is disposed above the disk 933. The pressing member 932 is formed with a stop 934. The disk 933 is formed with a flange 935 disposed at an upper end portion thereof, and a lever 936 disposed at a lower end portion thereof and extending outwardly of the mounting housing 931.

Figure 4:
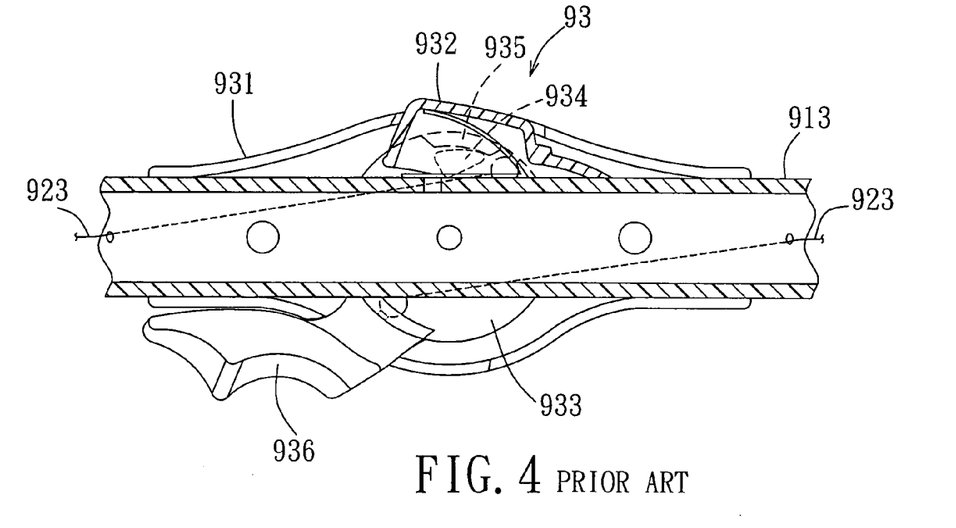
FIG. 4 is a sectional view of the single-hand-operated actuating mechanism of the conventional foldable stroller, illustrating operation of a lever.

With particular reference to FIG. 2, when the pressing member 932 is not pressed, the stop 934 of the pressing member 932 is in contact with the flange 935, thereby preventing rotation of the disk 933. To enable folding of the stroller, with particular reference to FIG. 3, the pressing member 932 is first pressed in a downward direction by the thumb of one hand to pivot the pressing member 932 downwardly to thereby move the stop 934 to a position below the flange 935. Next, with further reference to FIG. 4, the lever 936 is pivoted leftwardly by the remaining fingers of the hand to rotate the disk 933 clockwise. Hence, the cables 923 are moved to pull and remove the second members 922 from the first members 921, respectively, thereby allowing for rotation of the handle tube 913 relative to the front legs 911. However, such an operation of the single-hand-operated actuating mechanism 93 is difficult to perform and awkward for the user due to the directions of the forces that need to be applied by the thumb and fingers of the hand, respectively, to pivot the pressing member 932 and the lever 936.

SUMMARY OF THE INVENTION

The object of this invention is to provide a single-hand-operated actuating mechanism for a foldable stroller, which can be operated with ease.

According to an aspect of this invention, there is provided an actuating mechanism for a foldable stroller. The foldable stroller includes a foldable frame having a handle tube. The actuating mechanism comprises:

a mounting housing adapted to be disposed on the handle tube;

two cables;

a disk disposed in the mounting housing and adapted to be connected rotatably to the handle tube, the disk having a periphery formed with a notch, and a control lever extending outwardly of the mounting housing, the cables being fastened to the disk at two diametrically opposed positions, respectively, the control lever being pushable in a lever-driving direction to rotate relative to the mounting housing to thereby move the cables relative to each other;

a safety latch disposed in the mounting housing and having an integral engagement member engaging the notch in the disk, and an integral pushbutton pushable in a pushbutton-driving direction opposite to the lever-driving direction so as to remove the engagement member from the notch in the disk, thereby allowing for rotation of the disk in the mounting housing and, thus, folding of the foldable stroller; and a resilient member disposed between the mounting housing and the safety latch for biasing the engagement member of the safety latch to engage the notch in the disk.

Since the control lever and the pushbutton are actuated in opposite directions, the actuating mechanism can be operated easily by only a single hand.

According to another aspect of this invention, a foldable stroller comprises:

a foldable frame having a handle tube;

a mounting housing disposed on the handle tube;

two cables;

a disk disposed in the mounting housing and connected rotatably to the handle tube, the disk having a periphery formed with a notch, and a control lever extending outwardly of the mounting housing, the cables being fastened to the disk at two diametrically opposed positions, respectively, the control lever being pushable in a lever-driving direction to rotate relative to the mounting housing to thereby move the cables relative to each other;

a safety latch disposed in the mounting housing and having an integral engagement member engaging the notch in the disk, and an integral pushbutton pushable in a pushbutton-driving direction opposite to the lever-driving direction so as to remove the engagement member from the notch in the disk, thereby allowing for rotation of the disk in the mounting housing and, thus, folding of the foldable stroller; and a resilient member disposed between the mounting housing and the safety latch for biasing the engagement member of the safety latch to engage the notch in the disk.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 5:
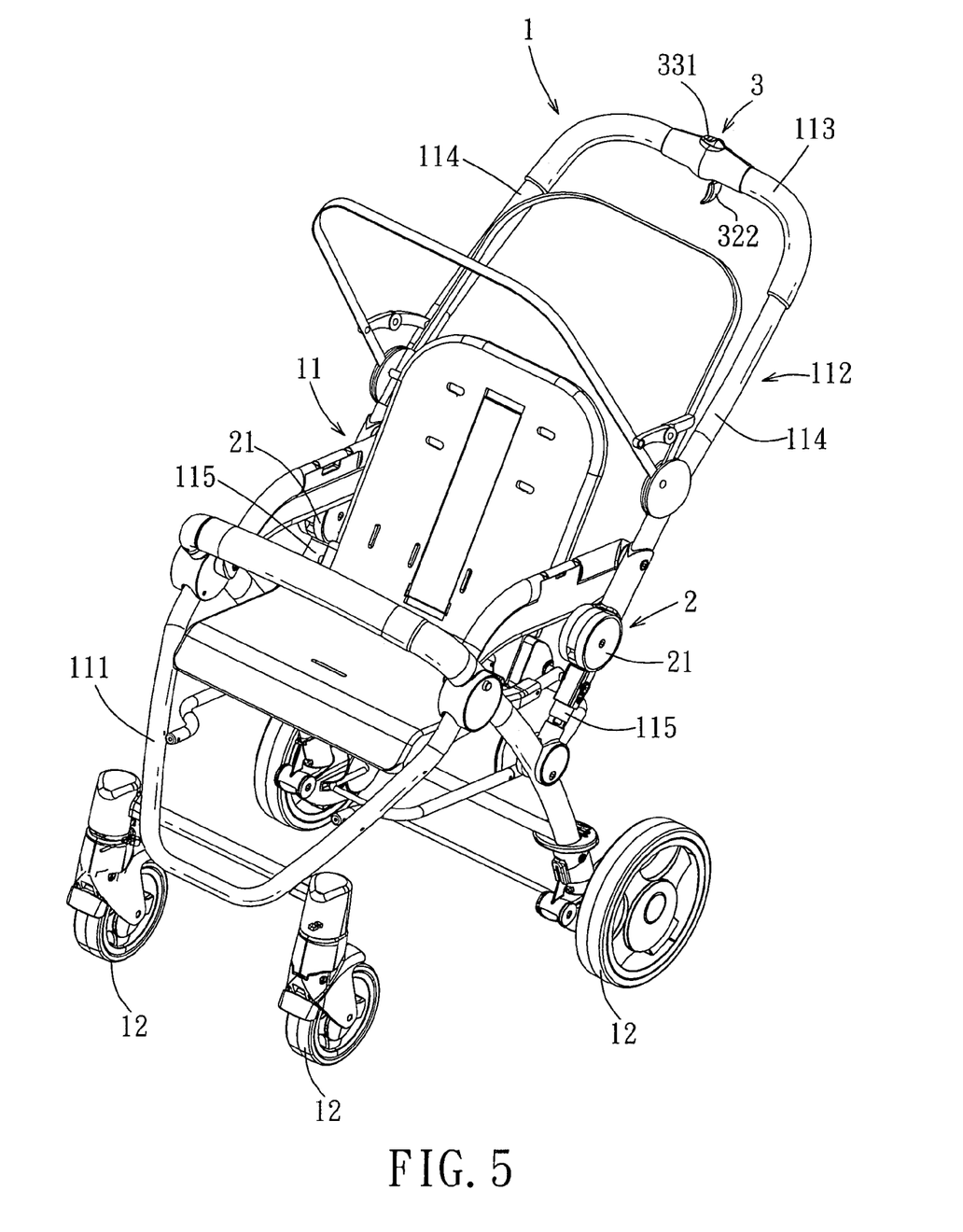
FIG. 5 is a perspective view of a foldable stroller including the preferred embodiment of a single-hand-operated actuating mechanism according to this invention.

With reference to FIG. 5, the preferred embodiment of a single-hand-operated actuating mechanism 3 according to this invention is mounted on a foldable stroller 1. The foldable stroller 1 includes a foldable frame 11, a plurality of casters 12 mounted on the foldable frame 11, a folding device 2, and two cables 22 (see FIG. 9).

Figure 6:
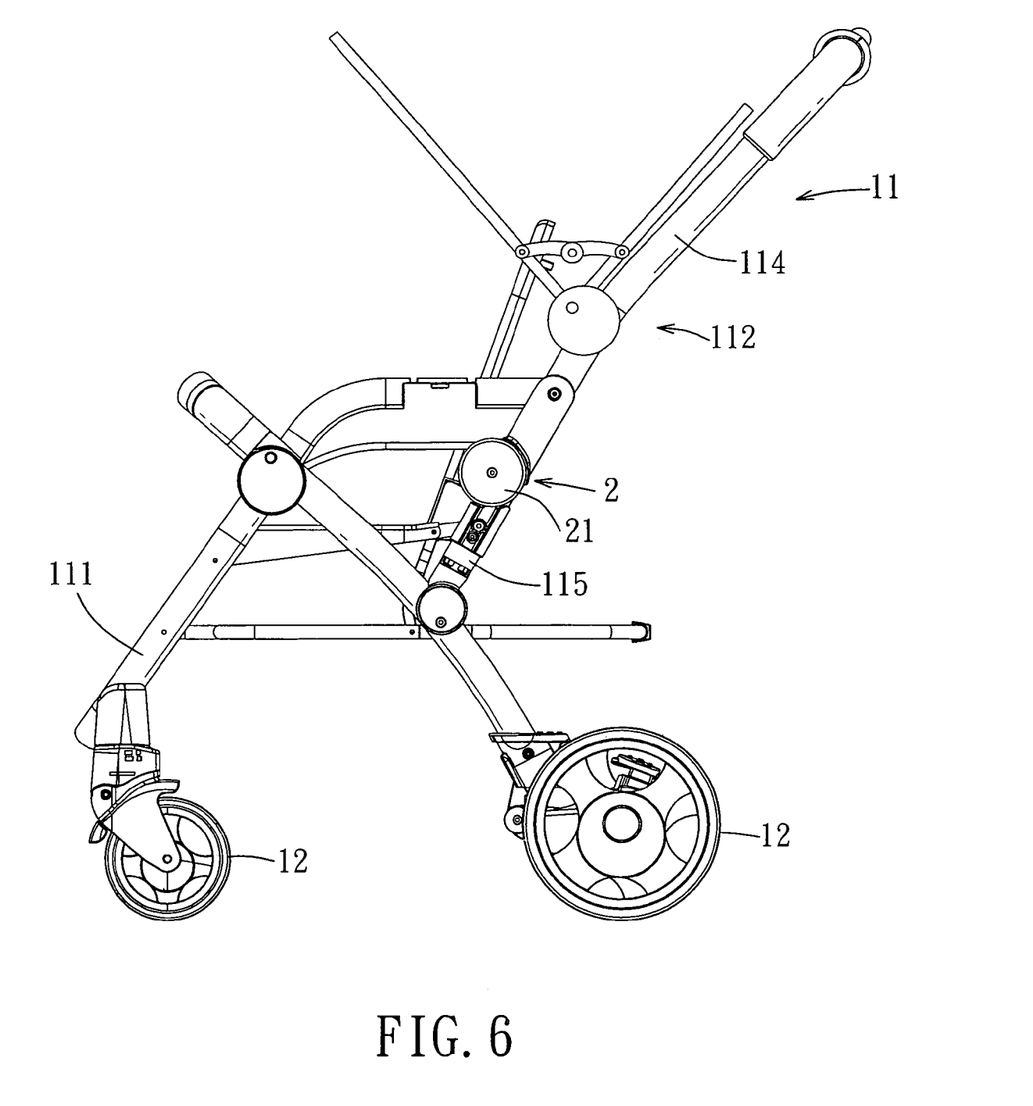
FIG. 6 is a side view of the foldable stroller shown in FIG. 5 in an unfolded state.
Figure 7:
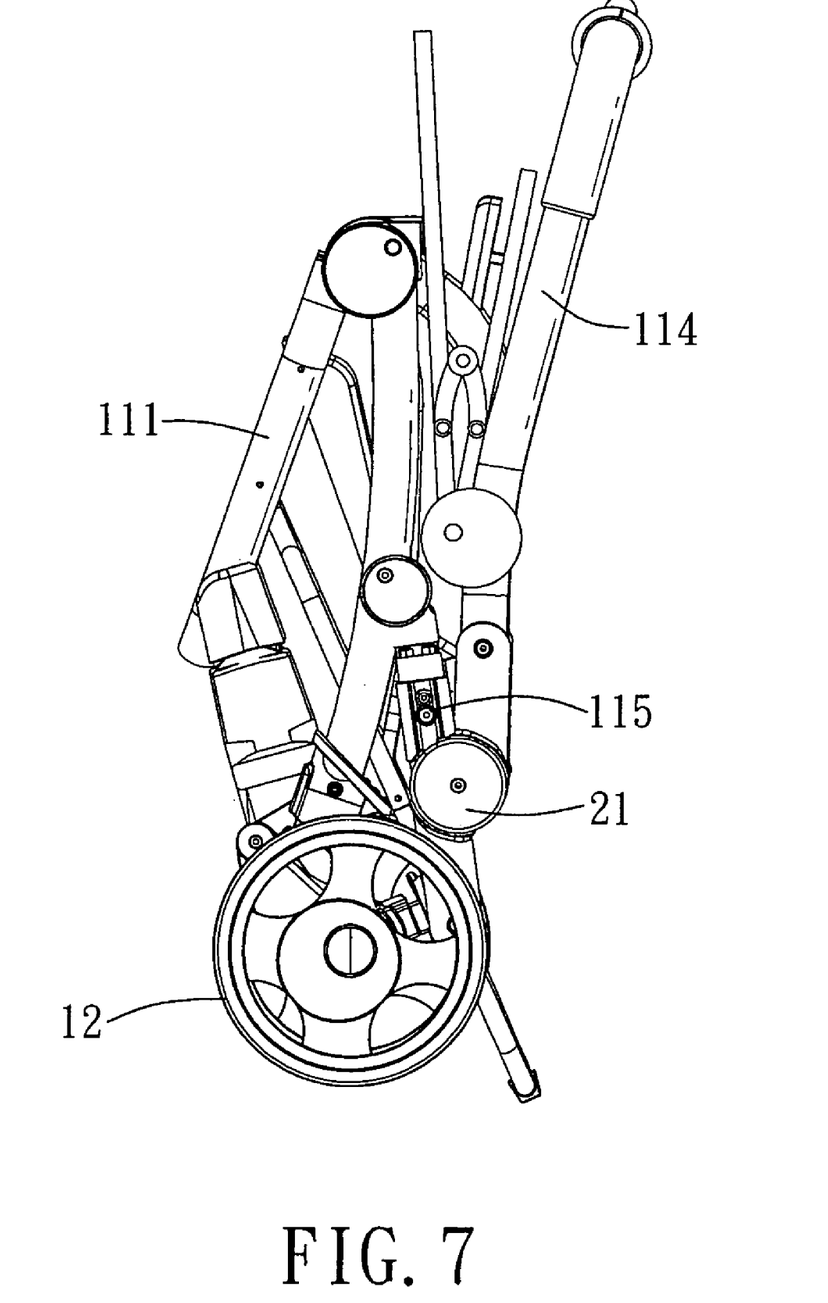
FIG. 7 is a side view of the foldable stroller shown in FIG. 5 in a folded state.
Figure 9:
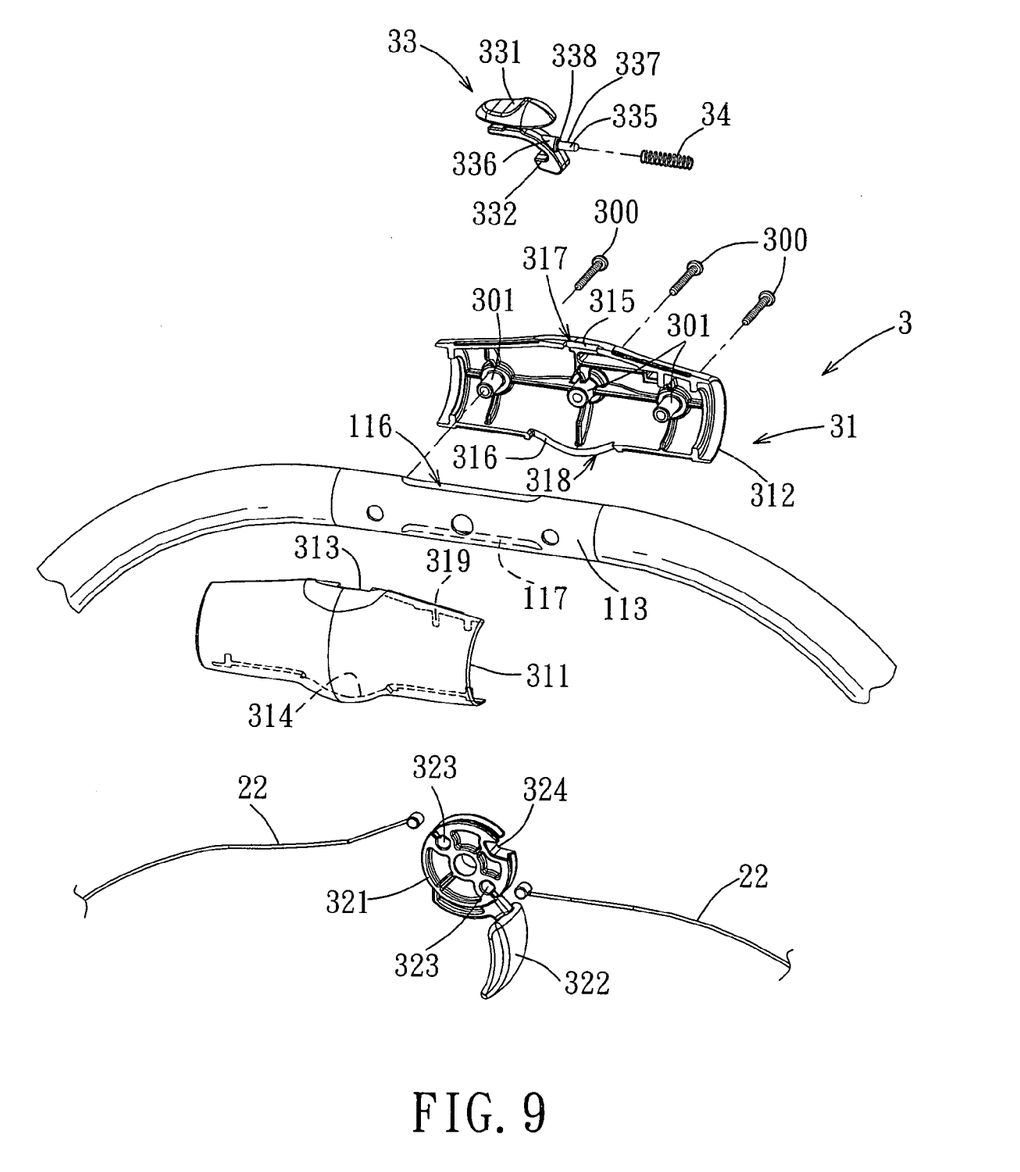
FIG. 9 is an exploded perspective view of the preferred embodiment.

With further reference to FIGS. 6 and 7, the foldable frame 11 includes a bottom frame 111, a handle tube 112, and two pivot rods 115. The handle tube 112 is generally U-shaped, and has a horizontal grip section 113 and two side rod sections 114 extending respectively from two opposite ends of the grip section 113 in the same direction. The pivot rods 115 have top ends connected respectively and pivotally to bottom ends of the side rod sections 114, and bottom ends connected respectively and pivotally to two opposite sides of the bottom frame 111. The pivot rods 115 and the side rod sections 114 of the handle tube 112 may be placed in an unfolded state shown in FIG. 6, where the pivot rods 115 are substantially aligned respectively with the side rod sections 114, and are convertible into a folded state shown in FIG. 7, where the pivot rods 115 abut respectively against the side rod sections 114. With further reference to FIG. 9, the handle tube 112 has upper and lower through holes 116, 117 formed respectively in top and lower sidewalls of the tube wall of the grip section 113. The cables 22 extend respectively in the side rod sections 114.

Figure 8:
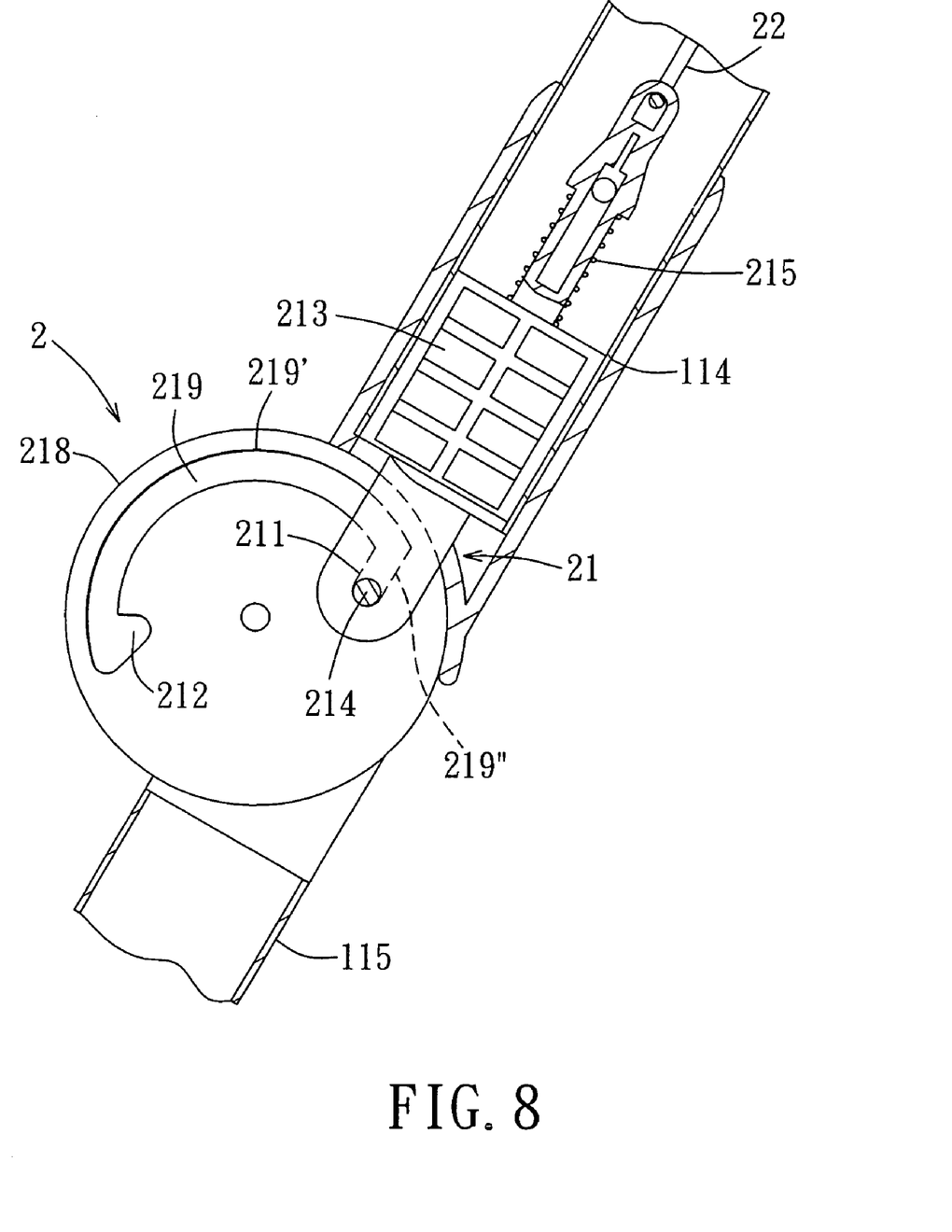
FIG. 8 is a schematic sectional view of a folding mechanism of the foldable stroller shown in FIG. 5.

With further reference to FIG. 8, the folding device 2 includes two folding mechanisms 21 each disposed between the corresponding side rod section 114 and the corresponding pivot rod 115.

Each of the folding mechanisms 21 includes a knuckle 218 located between the corresponding side rod section 114 and the corresponding pivot rod 115, first and second positioning grooves 211, 212 formed in the knuckle 218, and a resilient positioning member 213 disposed within the bottom end of the corresponding side rod section 114. Each of the resilient positioning members 213 has an engaging portion 214 biased to engage the first positioning groove 211 in the knuckle 218 by a coiled compression spring 215 disposed in the corresponding side rod section 114. When the pivot rods 115 and the side rod sections 114 of the handle tube 112 are in the folded state, the engaging portions 214 are disposed respectively in the second positioning grooves 212. Each of the cables 22 has a lower end fastened to a top end of the corresponding resilient positioning member 213, and an upper end connected to the single-hand-operated actuating mechanism 3, as shown in FIG. 9.

Figure 10:
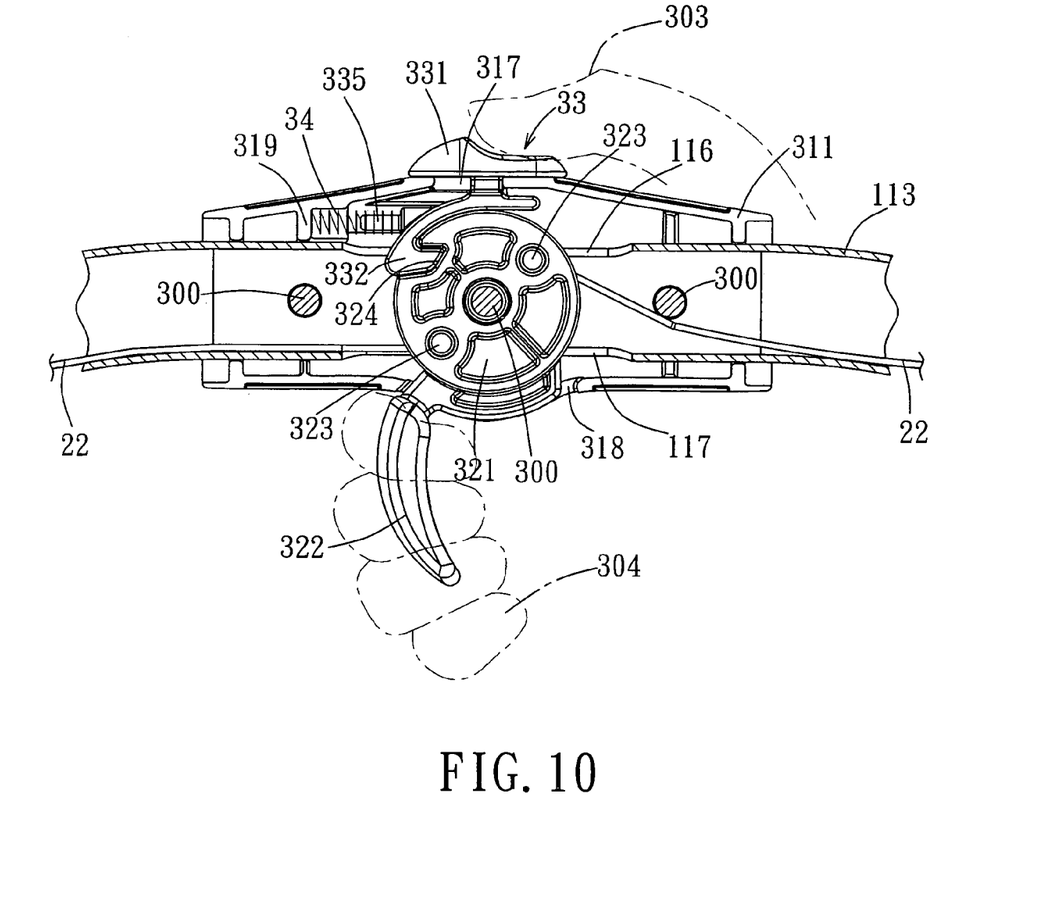
FIG. 10 is a schematic side view of the preferred embodiment.

With particular reference to FIGS. 9 and 10, the single-hand-operated actuating mechanism 3 is disposed on the grip section 113, and includes a mounting housing 31, a disk 321, a safety latch 33, and a resilient member 34 configured as a coiled compression spring. The mounting housing 31 is sleeved fixedly on the grip section 113, and includes front and rear housing halves 311, 312 located respectively to two sides of the grip section 113. Each of the front and rear housing halves 311, 312 is formed with an upper notch 313, 315, and a lower notch 314, 316. The upper notches 313, 315 define cooperatively an upper slot 317 disposed at a top portion of the mounting housing 31. The lower notches 314, 316 define cooperatively a lower slot 318 disposed at a bottom portion of the mounting housing 31. The upper and lower slots 317, 318 extend along an axial direction of the grip section 113. In this embodiment, the rear housing half 312 is formed with a plurality of insert tubes 301 extending through the grip section 113. A plurality of lock bolts 300 extend respectively through the insert tubes 301, and engage threadedly the front housing half 311 to thereby interconnect the front and rear housing halves 311, 312.

The disk 321 is disposed in the mounting housing 31, and is sleeved rotatably on one of the insert tubes 301. The disk 321 includes two diametrically opposed cable-anchoring holes 323 permitting corresponding ends of the cables 22 to be anchored therein, a periphery formed with a notch 324, and an integral control lever 322 extending outwardly of the mounting housing 31. In this embodiment, the control lever 322 is configured as a curved handle. The disk 321 has top and bottom edges projecting respectively from the upper and lower through holes 116, 117 in the grip section 113. The control lever 322 extends through the lower slot 318 in the mounting housing 31 so as to allow for manual operation.

The safety latch 33 has an integral pushbutton 331, an integral engagement member 332, and an integral spring-positioning rod 335. The engagement member 332 and the spring-positioning rod 335 are disposed in the mounting housing 31, and are spaced apart from the pushbutton 331. The safety latch 33 extends through the upper slot 317 in the mounting housing 31, and is movable along the axial direction of the grip section 113. The pushbutton 331 is disposed outwardly of the mounting housing 31, and has a bottom surface in contact with an outer surface of the mounting housing 31. The engagement member 332 is configured as a hook, and has a free end engaging the notch 324 in the disk 321 to thereby prevent rotation of the disk 321. The upper slot 317 is disposed between the pushbutton 331 and the engaging member 332. The engaging member 332 is sized to prevent upward removal of the safety latch 33 from the upper slot 317. As such, the pushbutton 331 is pushable to move along the upper slot 317. The spring-positioning rod 335 has a large-diameter rod portion 336 and a small-diameter portion 337 that has a diameter smaller than that of the large-diameter rod portion 336 to define a shoulder 338 therebetween.

The resilient member 34 is sleeved on the small-diameter rod portion 337 between the shoulder 338 of the spring-positioning rod 335 and a stop wall 319 of the mounting housing 31 so as to bias the engagement member 332 to move toward the disk 321. As such, when the safety latch 33 is not operated, the engagement member 332 is biased to engage the notch 324 in the disk 321. In this state, since the engaging portions 214 engage respectively the first positioning grooves 211, relative rotation of the side rod sections 114 and the pivot rods 115 can be prevented to thereby maintain the stroller in an unfolded state.

Figure 11:
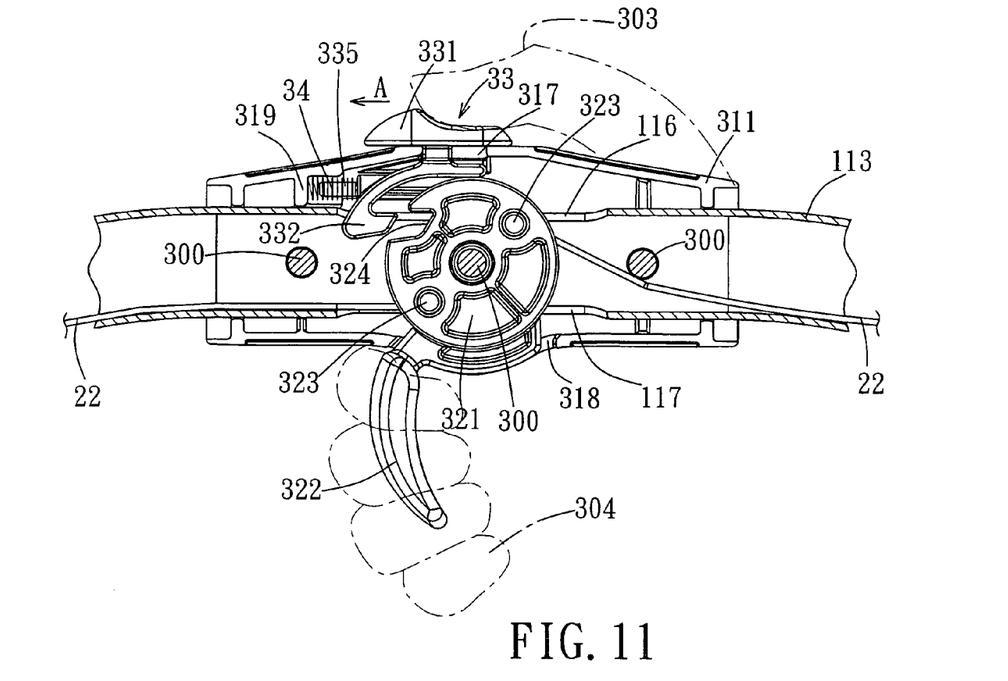
FIG. 11 is a schematic side view of the preferred embodiment, illustrating operation of a safety latch.
Figure 12:
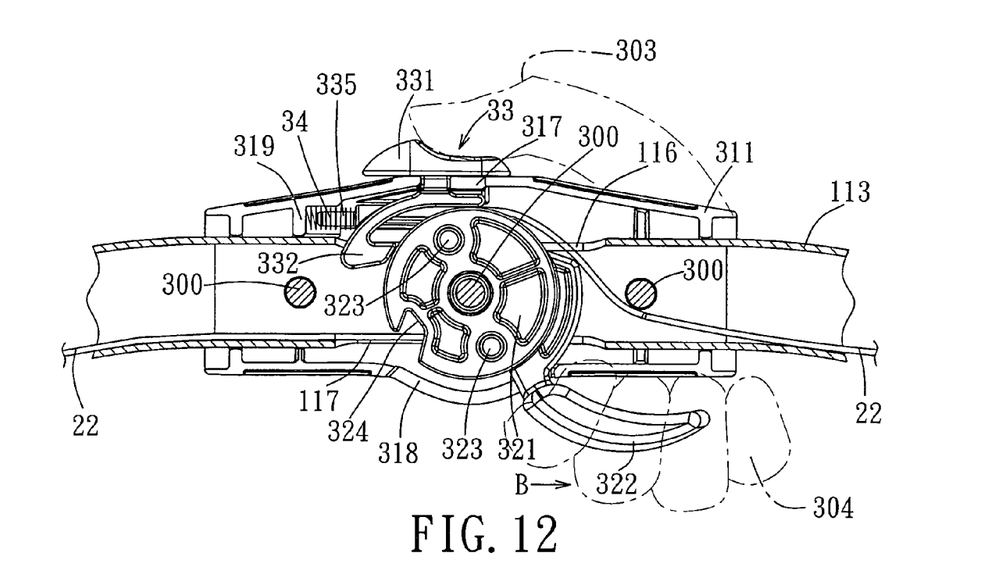
FIG. 12 is a schematic side view of the preferred embodiment, illustrating operation of a control lever.

To fold the stroller, with further reference to FIG. 11, the pushbutton 331 is pushed in a pushbutton-driving direction (A) by the thumb of one hand to remove the engagement member 332 from the notch 324 in the disk 321. Subsequently, with further reference to FIG. 12, the control lever 322 is pushed in a lever-driving direction (B) opposite to the pushbutton-driving direction (A) to rotate the disk 321. Hence, each of the cables 22 is moved to pull and move the corresponding engaging portion 214 from the corresponding first positioning groove 211 to a junction between a curved slot portion 219' and a straight slot portion 219" of a slide slot unit 219, thereby allowing for relative rotation of the side rod sections 114 and the pivot rods 115.

When the forces applied by the hand to the pushbutton 331 and the control lever 322 are released and the pivot rods 115 and the side rod sections 114 are placed in an unfolded state, the disk 321 and the engaging portions 214 of the resilient positioning members 213 are returned to their original positions shown in FIG. 10 and FIG. 8 by the coiled compression spring 215. During return of the disk 321 and the engaging portions 214 of the resilient positioning members 213 to their original positions, the engagement member 332 of the safety latch 33 slides on the periphery of the disk 321 due to the biasing action of the resilient member 34. Thus, when the disk 321 and the engaging portions 214 arrive at their respective original positions, the engagement member 332 can be returned to the position shown in FIG. 10.

With this invention thus explained, it is apparent that numerous modifications and variations can be made without departing from the scope and spirit of this invention. It is therefore intended that this invention be limited only as indicated by the appended claims.

We claim:

1. An actuating mechanism for a foldable stroller, the foldable stroller including a foldable frame having a handle tube, and two cables, said actuating mechanism comprising:
   a mounting housing adapted to be disposed on the handle tube;
   a disk disposed in said mounting housing and adapted to be connected rotatably to the handle tube, said disk having a periphery formed with a notch, and a control lever extending outwardly of said mounting housing, said disk being adapted to permit the cables to be fastened thereto at two diametrically opposed positions, respectively, said control lever being pushable in a lever-driving direction to rotate relative to said mounting housing to thereby move the cables relative to each other;
   a safety latch disposed in said mounting housing and having an engagement member engaging said notch in said disk, and a pushbutton pushable in a pushbutton-driving direction opposite to said lever-driving direction so as to remove said engagement member from said notch in said disk, thereby allowing for rotation of said disk in said mounting housing and, thus, folding of the foldable stroller; and
   a resilient member disposed between said mounting housing and said safety latch for biasing said engagement member of said safety latch to engage said notch in said disk.

2. The actuating mechanism as claimed in claim 1, wherein said engagement member of said safety latch is configured as a hook.

3. The actuating mechanism as claimed in claim 2, wherein said engagement member is formed with an integral spring-positioning rod, said spring-positioning rod having a large-diameter rod portion and a small-diameter rod portion that has a diameter smaller than that of said large-diameter rod portion to define a shoulder therebetween, said resilient member being sleeved on said small-diameter rod portion between said mounting housing and said shoulder.

4. The actuating mechanism as claimed in claim 1, wherein said mounting housing has top and bottom portions that are formed respectively with upper and lower slots, said pushbutton being movable along said upper slot in said mounting housing, said control lever extending through said lower slot in said mounting housing so as to allow for manual operation.

5. The actuating mechanism as claimed in claim 4, wherein said pushbutton extends through said upper slot in said mounting housing, said control lever being movable within said lower slot along an axial direction of said handle tube.

6. The actuating mechanism as claimed in claim 1, wherein said push-button direction is an axial direction of said handle tube.

7. The foldable stroller as claimed in claim 6, wherein said lever-driving direction is an axial direction of said handle tube.

8. A foldable stroller comprising:
   a foldable frame having a handle tube;
   a mounting housing disposed on the handle tube;
   two cables;
   a disk disposed in said mounting housing and connected rotatably to the handle tube, said disk having a periphery formed with a notch, and a control lever extending outwardly of said mounting housing, said cables being fastened to said disk at two diametrically opposed positions, respectively, said control lever being pushable in a lever-driving direction relative to said mounting housing to thereby move said cables relative to each other;
   a safety latch disposed in said mounting housing and having an engagement member engaging said notch in said disk, and an pushbutton pushable in a pushbutton-driving direction opposite to said lever-driving direction so as to remove said engagement member from said notch in said disk, thereby allowing for rotation of said disk in said mounting housing and, thus, folding of said foldable stroller; and
   a resilient member disposed between said mounting housing and said safety latch for biasing said engagement member of said safety latch to engage said notch in said disk.

9. The foldable stroller as claimed in claim 8, wherein said engagement member of said safety latch is configured as a hook.

10. The foldable stroller as claimed in claim 9, wherein said engagement member is formed with an integral spring-positioning rod, said spring-positioning rod having a large-diameter rod portion and a small-diameter rod portion that define a shoulder therebetween, said resilient member being sleeved on said small-diameter rod portion between said mounting housing and said shoulder.

11. The foldable stroller as claimed in claim 10, wherein said handle tube has a top sidewall portion formed with an upper through hole, and a bottom sidewall portion formed with a lower through hole, said disk having top and bottom edges projecting respectively from said upper and lower through holes.

12. The foldable stroller as claimed in claim 8, wherein said mounting housing has top and bottom portions that are formed respectively with upper and lower slots, said pushbutton being movable along said upper slot in said mounting housing, said control lever extending through said lower slot in said mounting housing so as to allow for manual operation.

13. The foldable stroller as claimed in claim 12, wherein said pushbutton extends through said upper slot in said mounting housing, said control lever being movable within said lower slot along an axial direction of said handle tube.

14. An actuating mechanism for a foldable stroller, the foldable stroller including a foldable frame having a handle tube, and two cables, said actuating mechanism comprising:
  a mounting housing adapted to be disposed on the handle tube;
  a disk disposed in said mounting housing and adapted to be connected rotatably to the handle tube, said disk having a periphery formed with a notch, and a control lever extending outwardly of said mounting housing, said disk being adapted to permit the cables to be fastened thereto at two diametrically opposed positions, respectively, said control lever being pushable in a lever-driving direction to rotate relative to said mounting housing to thereby move the cables relative to each other; and
  a safety latch disposed slidably in said mounting housing and having an engagement member engaging said notch in said disk, and a pushbutton biased to engage said engagement member within said notch in said disk and operable in a direction away from said disk to remove said engagement member from said notch in said disk, thereby allowing for rotation of said disk relative to the handle tube.

15. The actuating mechanism as claimed in claim 14, wherein said engagement member of said safety latch is configured as a hook.

16. The actuating mechanism as claimed in claim 15, wherein said engagement member is formed with an integral spring-positioning rod, said spring-positioning rod having a large-diameter rod portion and a small-diameter rod portion that has a diameter smaller than that of said large-diameter rod portion to define a shoulder therebetween, said resilient member being sleeved on said small-diameter rod portion between said mounting housing and said shoulder.

17. The actuating mechanism as claimed in claim 14, wherein said mounting housing has top and bottom portions that are formed respectively with upper and lower slots, said pushbutton being movable along said upper slot in said mounting housing, said control lever extending through said lower slot in said mounting housing so as to allow for manual operation.

18. The actuating mechanism as claimed in claim 17, wherein said pushbutton extends through said upper slot in said mounting housing, said control lever being movable within said lower slot along an axial direction of said handle tube.

19. The actuating mechanism as claimed in claim 14, wherein said push-button direction is an axial direction of the handle tube.

* * * * *